United States Patent
Ye

(10) Patent No.: US 11,425,397 B2
(45) Date of Patent: *Aug. 23, 2022

(54) ON BLOCK LEVEL BI-PREDICTION WITH WEIGHTED AVERAGING

(71) Applicant: ALIBABA GROUP HOLDING LIMITED, Grand Cayman (KY)

(72) Inventor: Yan Ye, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/095,839

(22) Filed: Nov. 12, 2020

(65) Prior Publication Data

US 2021/0067787 A1 Mar. 4, 2021

Related U.S. Application Data

(63) Continuation of application No. 16/228,741, filed on Dec. 20, 2018, now Pat. No. 10,855,992.

(51) Int. Cl.
*H04N 19/159* (2014.01)
*H04N 19/513* (2014.01)
*H04N 19/109* (2014.01)
*H04N 19/184* (2014.01)

(52) U.S. Cl.
CPC ......... *H04N 19/159* (2014.11); *H04N 19/109* (2014.11); *H04N 19/184* (2014.11); *H04N 19/513* (2014.11)

(58) Field of Classification Search
CPC .. H04N 19/159; H04N 19/109; H04N 19/184; H04N 19/513
See application file for complete search history.

(56) References Cited

U.S. PATENT DOCUMENTS

| 2014/0072041 | A1 | 3/2014 | Seregin et al. |
| 2014/0198846 | A1* | 7/2014 | Guo ............ H04N 19/30 375/240.12 |
| 2015/0103898 | A1 | 4/2015 | Ye et al. |
| 2018/0295385 | A1 | 10/2018 | Alshin et al. |

FOREIGN PATENT DOCUMENTS

WO    WO 2017/197146 A1    11/2017

OTHER PUBLICATIONS

PCT International Search Report and Written Opinion dated Apr. 24, 2020 issued in corresponding International Application No. PCT/US2019/067619 (19 pgs.).

* cited by examiner

*Primary Examiner* — Nam D Pham
(74) *Attorney, Agent, or Firm* — Finnegan, Henderson, Farabow, Garrett & Dunner, LLP

(57) ABSTRACT

Video encoding and decoding techniques for bi-prediction with weighted averaging are disclosed. According to certain embodiments, a computer-implemented video signaling method includes signaling, by a processor to a video decoder, a bitstream including weight information used for prediction of a coding unit (CU). The weight information indicates: if weighted prediction is enabled for a bi-prediction mode of the CU, disabling weighted averaging for the bi-prediction mode.

20 Claims, 14 Drawing Sheets

Table 1100: Disabling CU-Level Flag to Indicate if BWA Is Applied

| coding_unit( x0, y0, cbWidth, cbHeight, treeType ) { | Descriptor |
|---|---|
| ... | |
| 1101 — if( sps_gbi_enabled_flag && inter_affine_flag == 0 && inter_pred_idc[ x0 ][ y0 ] == PRED_BI && merge_flag[ x0 ][ y0 ]==0 && merge_affine_flag[ x0 ][ y0 ]==0 && cbWidth*cbHeight >=256 && luma_weight_l0_flag [ ref_idx_l0[ x0 ][ y0 ] ] == 0 && chroma_weight_l0_flag [ ref_idx_l0[ x0 ][ y0 ] ] == 0 && luma_weight_l1_flag [ ref_idx_l1[ x0 ][ y0 ] ] == 0 && chroma_weight_l1_flag [ ref_idx_l1[ x0 ][ y0 ] ] == 0 ) | |
| gbi_idx[ x0 ][ y0 ] | ae(v) |
| ... | |
| } | |

Table 400: Weighted Prediction Parameter Signaling

| pred_weight_table( ) { | Descriptor |
|---|---|
|   luma_log2_weight_denom | ue(v) |
|   if( ChromaArrayType != 0 ) | |
|     delta_chroma_log2_weight_denom | se(v) |
|   for( i = 0; i <= num_ref_idx_l0_active_minus1; i++ ) | |
|     luma_weight_l0_flag[ i ] | u(1) |
|   if( ChromaArrayType != 0 ) | |
|     for( i = 0; i <= num_ref_idx_l0_active_minus1; i++ ) | |
|       chroma_weight_l0_flag[ i ] | u(1) |
|   for( i = 0; i <= num_ref_idx_l0_active_minus1; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( slice_type == B ) { | |
|     for( i = 0; i <= num_ref_idx_l1_active_minus1; i++ ) | |
|       luma_weight_l1_flag[ i ] | u(1) |
|     if( ChromaArrayType != 0 ) | |
|       for( i = 0; i <= num_ref_idx_l1_active_minus1; i++ ) | |
|         chroma_weight_l1_flag[ i ] | u(1) |
|     for( i = 0; i <= num_ref_idx_l1_active_minus1; i++ ) { | |
|       if( luma_weight_l1_flag[ i ] ) { | |
|         delta_luma_weight_l1[ i ] | se(v) |
|         luma_offset_l1[ i ] | se(v) |
|       } | |
|       if( chroma_weight_l1_flag[ i ] ) | |
|         for( j = 0; j < 2; j++ ) { | |
|           delta_chroma_weight_l1[ i ][ j ] | se(v) |
|           delta_chroma_offset_l1[ i ][ j ] | se(v) |
|         } | |
|     } | |
|   } | |
| } | |

FIG. 4

Table 600: CU-Level Index to Indicate BWA Weight

| coding_unit( x0, y0, cbWidth, cbHeight, treeType ) { | Descriptor |
|---|---|
| ... | |
| } else { /* MODE_INTER */ | |
| ... | |
| } else { | |
|     merge_flag[ x0 ][ y0 ] | ae(v) |
| ... | |
| } else { | |
| ... | |
|     if( sps_gbi_enabled_flag && inter_affine_flag == 0 && inter_pred_idc[ x0 ][ y0 ] == PRED_BI && merge_flag[ x0 ][ y0 ]==0 && merge_affine_flag[ x0 ][ y0 ]==0 && cbWidth*cbHeight >=256 ) | |
|     gbi_idx[ x0 ][ y0 ] | ae(v) |
| } | |
| } | |
| } | |
| ... | |
| } | |

601 points to the if( sps_gbi_enabled_flag ... ) condition
602 points to the gbi_idx[ x0 ][ y0 ] row

FIG. 6

Table 800: PPS Syntax to Enable/Disable Weighted Prediction

| pic_parameter_set_rbsp( ) { | Descriptor |
|---|---|
| pps_pic_parameter_set_id | ue(v) |
| pps_seq_parameter_set_id | ue(v) |
| ... | |
| weighted_pred_flag | u(1) |
| weighted_bipred_flag | u(1) |
| ... | |
| } | |

801 brackets weighted_pred_flag and weighted_bipred_flag rows.

FIG. 8

Table 900: CU-Level Index to Indicate BWA Weight

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   ... | |
|     if( ( weighted_pred_flag && slice_type == P ) \|\| <br>      ( weighted_bipred_flag && slice_type == B ) ) | |
|       pred_weight_table( ) | |
|   ... | |
| } | |

(901 points to the if( weighted_pred_flag... ) row)

FIG. 9

Table 1000: Disabling CU-Level Flag to Indicate if BWA Is Applied

Table 1100: Disabling CU-Level Flag to Indicate if BWA Is Applied

| coding_unit( x0, y0, cbWidth, cbHeight, treeType ) { | Descriptor |
|---|---|
| ... | |
| if( sps_gbi_enabled_flag && inter_affine_flag == 0 && <br> inter_pred_idc[ x0 ][ y0 ] == PRED_BI && merge_flag[ x0 ][ y0 ]==0 && <br> merge_affine_flag[ x0 ][ y0 ]==0 && cbWidth*cbHeight >=256 && <br> luma_weight_l0_flag [ ref_idx_l0[ x0 ][ y0 ] ] == 0 && <br> chroma_weight_l0_flag [ ref_idx_l0[ x0 ][ y0 ] ] == 0 && <br> luma_weight_l1_flag [ ref_idx_l1[ x0 ][ y0 ] ] == 0 && <br> chroma_weight_l1_flag [ ref_idx_l1[ x0 ][ y0 ] ] == 0 ) | |
|    gbi_idx[ x0 ][ y0 ] | ae(v) |
| ... | |
| } | |

1101 points to the bracketed condition block.

FIG. 11

ON BLOCK LEVEL BI-PREDICTION WITH WEIGHTED AVERAGING

CROSS-REFERENCE TO RELATED APPLICATIONS

This application is a continuation of U.S. patent application Ser. No. 16/228,741, filed Dec. 20, 2018, which is incorporated herein by reference in its entirety.

TECHNICAL FIELD

The present disclosure generally relates to video processing, and more particularly, to video coding and decoding using bi-prediction with weighted averaging (BWA) at block (or coding unit) level.

BACKGROUND

Video coding systems are often used to compress digital video signals, for instance to reduce storage space consumed or to reduce transmission bandwidth consumption associated with such signals.

A video coding system may use various tools or techniques to solve different problems. For example, temporal motion prediction is an effective method to increase the coding efficiency and provides high compression. The temporal motion prediction may be a single prediction using one reference picture or a bi-prediction using two reference pictures. In some conditions, such as when fading occurs, bi-prediction may not yield the most accurate prediction. To compensate for this, weighted prediction may be used to weigh the two prediction signals differently.

However, the different coding tools are not always compatible. For example, it may not be suitable to apply the above-mentioned temporal prediction, bi-prediction, or weighted prediction to the same coding block (e.g., coding unit), or in the same slice or same picture. Therefore, it is desirable to make the different coding tools interact with each other properly.

SUMMARY

Embodiments of the present disclosure relate to methods of coding and signaling weights of weighted-averaging based bi-prediction, at coding-unit (CU) level. In some embodiments, a computer-implemented video signaling method is provided. The video signaling method includes signaling, by a processor to a video encoder, a bitstream including weight information used for prediction of a coding unit (CU). The weight information indicates: if weighted prediction is enabled for a bi-prediction mode of the CU, disabling weighted averaging for the bi-prediction mode.

In some embodiments, a computer-implemented video coding method is provided. The video coding method includes constructing, by a processor, a merge candidate list for a coding unit, the merge candidate list including motion information of a non-affine inter-coded block of the coding unit, the motion information including a bi-prediction weight associated with the non-affine inter-coded block. The video coding method also includes coding, by the processor, based on the motion information.

In some embodiments, a computer-implemented video signaling method is provided. The video signaling method includes determining, by a processor, a value of a bi-prediction weight used for a coding unit (CU) of a video frame. The video signaling method also includes determining, by the processor, whether the bi-prediction weight is an equal weight. The video signaling method further includes in response to the determination, signaling, by the processor to a video decoder: a bitstream including a first syntax element indicating the equal weight when the bi-prediction weight is an equal weight, or after determining that the bi-prediction weight is an unequal weight, a bitstream including a second syntax element indicating a value of the bi-prediction weight corresponding to the unequal weight.

In some embodiments, a computer-implemented signaling method performed by a decoder is provided. The signaling method includes receiving, by the decoder from a video encoder, a bitstream including weight information used for prediction of a coding unit (CU). The signaling method also includes determining, based on the weight information, that weighted averaging for the bi-prediction mode is disabled if weighted prediction is enabled for a bi-prediction mode of the CU.

In some embodiments, a computer-implemented video coding method performed by a decoder is provided. The video coding method includes receiving, by the decoder, a merge candidate list for a coding unit from an encoder, the merge candidate list including motion information of a non-adjacent inter-coded block of the coding unit. The video coding method also includes determining a bi-prediction weight associated with the non-adjacent inter-coded block based on the motion information.

In some embodiments, a computer-implemented signaling method performed by a decoder is provided. The signaling method includes receiving, by the decoder, from a video encoder, a bitstream including a first syntax element corresponding to a bi-prediction weight used for a coding unit (CU) of a video frame, or a bitstream including a second syntax element corresponding to the bi-prediction weight. The signaling method also includes in response to receiving the first syntax element, determining, by the processor, the bi-prediction weight is an equal weight. The signaling method further includes in response to receiving the first syntax element, determining, by the processor, the bi-prediction weight is an unequal weight, and determining, by the processor based on the second syntax element, a value of the unequal weight.

Aspects of the disclosed embodiments may include non-transitory, tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

FIG. 4 is a table of syntax elements used for weighted prediction (WP), consistent with embodiments of the present disclosure.

FIG. 6 is a table of syntax elements used for bi-prediction with weighted averaging (BWA), consistent with embodiments of the present disclosure.

FIG. 8 is a table of syntax elements used for signaling enablement or disablement of WP at picture level, consistent with embodiments of the present disclosure.

FIG. 9 is a table of syntax elements used for signaling enablement or disablement of WP at slice level, consistent with embodiments of the present disclosure.

FIG. 11 is a table of syntax elements used for maintaining exclusivity of WP and BWA at CU level, consistent with embodiments of the present disclosure.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
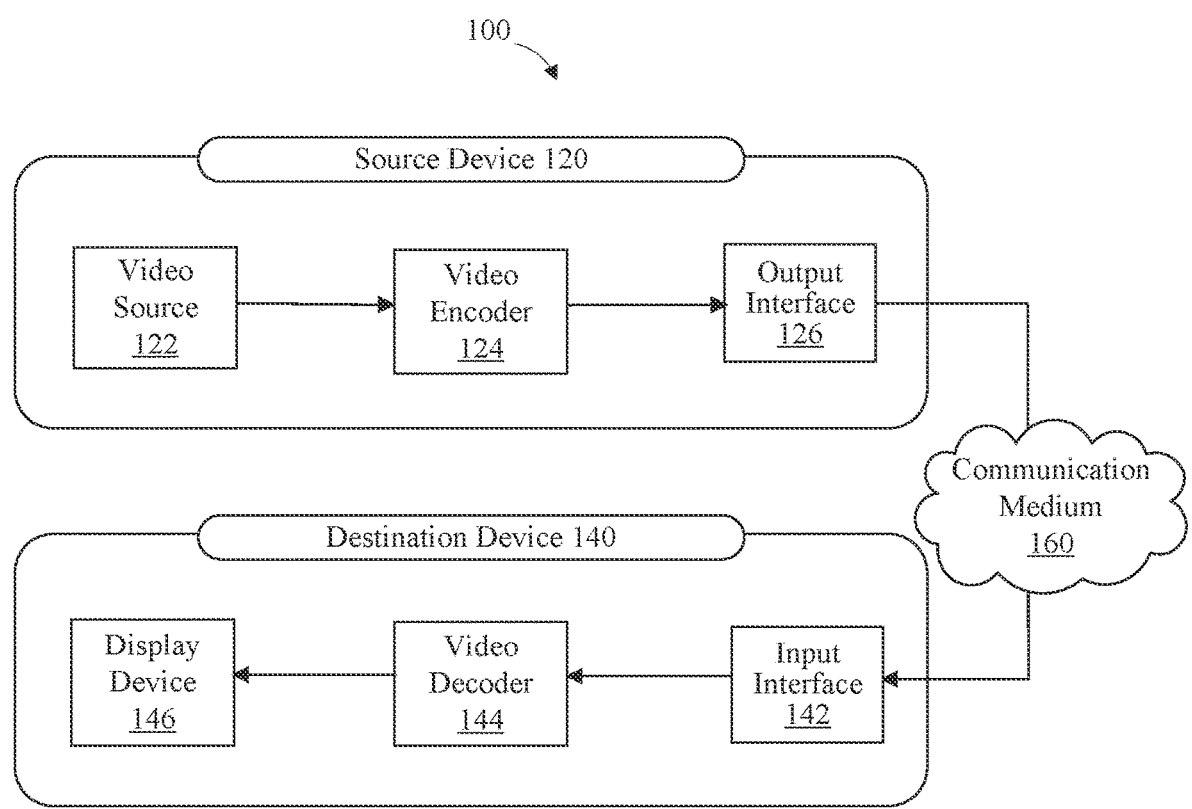
FIG. 1 is a schematic diagram illustrating an exemplary video encoding and decoding system, consistent with embodiments of the present disclosure.

FIG. 1 is a block diagram illustrating an example video encoding and decoding system 100 that may utilize techniques in compliance with various video coding standards, such as HEVC/H.265 and VVC/H.266. As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a tablet computer, a set-top box, a mobile phone, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include a video source 122, a video encoder 124, and an output interface 126. Destination device 140 may include an input interface 142, a video decoder 144, and a display device 146. In other examples, a source device and a destination device may include other components or arrangements. For example, source device 120 may receive video data from an external video source (not shown), such as an external camera. Likewise, destination device 140 may interface with an external display device, rather than including an integrated display device.

Although in the following description the disclosed techniques are explained as being performed by a video encoding device, the techniques may also be performed by a video encoder/decoder, typically referred to as a "CODEC." Moreover, the techniques of this disclosure may also be performed by a video preprocessor. Source device 120 and destination device 140 are merely examples of such coding devices in which source device 120 generates coded video data for transmission to destination device 140. In some examples, source device 120 and destination device 140 may operate in a substantially symmetrical manner such that each of source device 120 and destination device 140 includes video encoding and decoding components. Hence, system 100 may support one-way or two-way video transmission between source device 120 and destination device 140, e.g., for video streaming, video playback, video broadcasting, or video telephony.

Video source 122 of source device 120 may include a video capture device, such as a video camera, a video archive containing previously captured video, or a video feed interface to receive video from a video content provider. As a further alternative, video source 122 may generate computer graphics-based data as the source video, or a combination of live video, archived video, and computer-generated video. The captured, pre-captured, or computer-generated video may be encoded by video encoder 124. The encoded video information may then be output by output interface 126 onto a communication medium 160.

Output interface 126 may include any type of medium or device capable of transmitting the encoded video data from source device 120 to destination device 140. For example, output interface 126 may include a transmitter or a transceiver configured to transmit encoded video data from source device 120 directly to destination device 140 in real-time. The encoded video data may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded video data from source device 120 and provide the encoded video data to destination device 140, e.g., via network transmission.

Communication medium 160 may also be in the form of a storage media (e.g., non-transitory storage media), such as a hard disk, flash drive, compact disc, digital video disc. Blu-ray disc, volatile or non-volatile memory, or any other suitable digital storage media for storing encoded video data. In some embodiments, a computing device of a medium production facility, such as a disc stamping facility, may receive encoded video data from source device 120 and produce a disc containing the encoded video data.

Input interface 142 of destination device 140 receives information from communication medium 160. The received information may include syntax information including syntax elements that describe characteristics or processing of blocks and other coded units. The syntax information is defined by video encoder 124 and used by video decoder 144. Display device 146 displays the decoded video data to a user and may include any of a variety of display devices such as a cathode ray tube (CRT), a liquid crystal display (LCD), a plasma display, an organic light emitting diode (OLED) display, or another type of display device.

In a further example, the encoded video generated by source device 120 may be stored on a file server or a storage device. Input interface 142 may access stored video data from the file server or storage device via streaming or download. The file server or storage device may be any type of computing device capable of storing encoded video data and transmitting that encoded video data to destination device 140. Examples of a file server include a web server that supports a website, a file transfer protocol (FTP) server, a network attached storage (NAS) device, or a local disk drive. The transmission of encoded video data from the storage device may be a streaming transmission, a download transmission, or a combination thereof.

Video encoder 124 and video decoder 144 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 124 and video decoder 144 may be included in one or more encoders or decoders, either of which may be integrated as part of a combined encoder/decoder (CODEC) in a respective device.

Video encoder 124 and video decoder 144 may operate according to any video coding standard, such as the Versatile Video Coding (VVC/H.266) standard, the High Efficiency Video Coding (HEVC/H.265) standard, the ITU-T H.264 (also known as MPEG-4) standard, etc. Although not shown in FIG. 1, in some embodiments, video encoder 124 and video decoder 144 may each be integrated with an audio encoder and decoder, and may include appropriate MUX-DEMUX units, or other hardware and software, to handle encoding of both audio and video in a common data stream or separate data streams.

Figure 2:
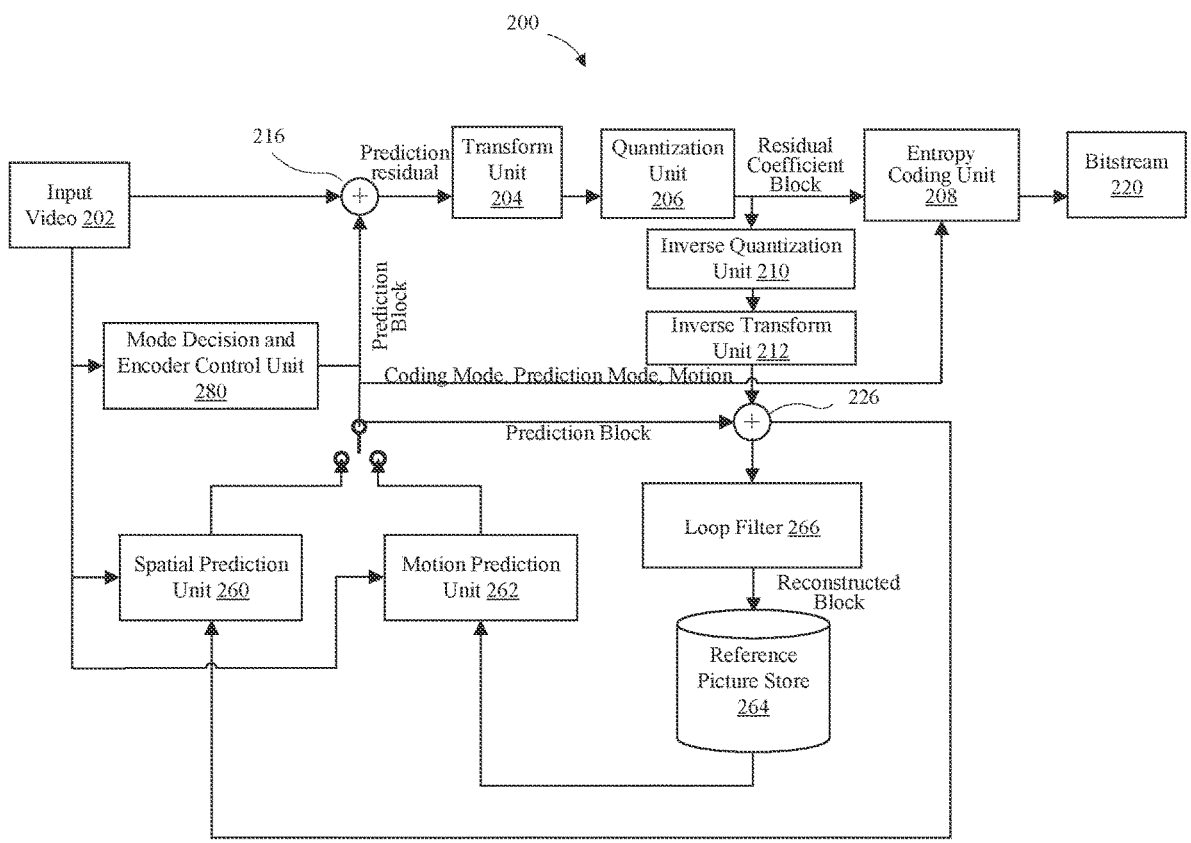
FIG. 2 is a schematic diagram illustrating an exemplary video encoder that may be a part of the exemplary system of FIG. 1, consistent with embodiments of the present disclosure.

FIG. 2 is a schematic diagram illustrating an exemplary video encoder 200, consistent with the disclosed embodiments. For example, video encoder 200 may be used as video encoder 124 in system 100 (FIG. 1). Video encoder 200 may perform intra- or inter-coding of blocks within video frames, including video blocks, or partitions or sub-partitions of video blocks. Intra-coding may rely on spatial prediction to reduce or remove spatial redundancy in video within a given video frame. Inter-coding may rely on temporal prediction to reduce or remove temporal redundancy in video within adjacent frames of a video sequence. Intra modes may refer to a number of spatial based compression modes and inter modes (such as uni-prediction or bi-prediction) may refer to a number of temporal-based compression modes.

Referring to FIG. 2, input video signal 202 may be processed block by block. For example, the video block unit may be a 16×16 pixel block (e.g., a macroblock (MB)). In HEVC, extended block sizes (e.g., a coding unit (CU)) may be used to compress video signals of resolution, e.g., 1080p and beyond. In HEVC, a CU may include up to 64×64 luma samples and corresponding chroma samples. In VVC, the size of a CU may be further increased to include 128×128 luma samples and corresponding chroma samples. A CU may be partitioned into prediction units (PUs), for which separate prediction methods may be applied. Each input video block (e.g., MB. CU. PU, etc.) may be processed by using spatial prediction unit 260 or temporal prediction unit 262.

Spatial prediction unit 260 performs spatial prediction (e.g., intra prediction) to the current CU using information on the same picture/slice containing the current CU. Spatial prediction may use pixels from the already coded neighboring blocks in the same video picture/slice to predict the current video block. Spatial prediction may reduce spatial redundancy inherent in the video signal. Temporal prediction (e.g., inter prediction or motion compensated prediction) may use samples from the already coded video pictures to predict the current video block. Temporal prediction may reduce temporal redundancy inherent in the video signal.

Temporal prediction unit 262 performs temporal prediction (e.g., inter prediction) to the current CU using information from picture(s)/slice(s) different from the picture/slice containing the current CU. Temporal prediction for a video block may be signaled by one or more motion vectors. The motion vectors may indicate the amount and the direction of motion between the current block and one or more of its prediction block(s) in the reference frames. If multiple reference pictures are supported, one or more reference picture indices may be sent for a video block. The one or more reference indices may be used to identify from which reference picture(s) in the reference picture store or Decoded Picture Buffer (DPB) 264, the temporal prediction signal may come. After spatial or temporal prediction, the mode decision and encoder control unit 280 in the encoder may choose the prediction mode, for example based on a rate-distortion optimization method. The prediction block may be subtracted from the current video block at adder 216. The prediction residual may be transformed by transformation unit 204 and quantized by quantization unit 206. The quantized residual coefficients may be inverse quantized at inverse quantization unit 210 and inverse transformed at inverse transform unit 212 to form the reconstructed residual. The reconstructed block may be added to the prediction block at adder 226 to form the reconstructed video block. The in-loop filtering, such as deblocking filter and adaptive loop filters 266, may be applied on the reconstructed video block before it is put in the reference picture store 264 and used to code future video blocks. To form the output video bitstream 220, coding mode (e.g., inter or intra), prediction mode information, motion information, and quantized residual coefficients may be sent to the entropy coding unit 208 to be compressed and packed to form the bitstream 220. The systems and methods, and instrumentalities described herein may be implemented, at least partially, within the temporal prediction unit 262.

Figure 3:
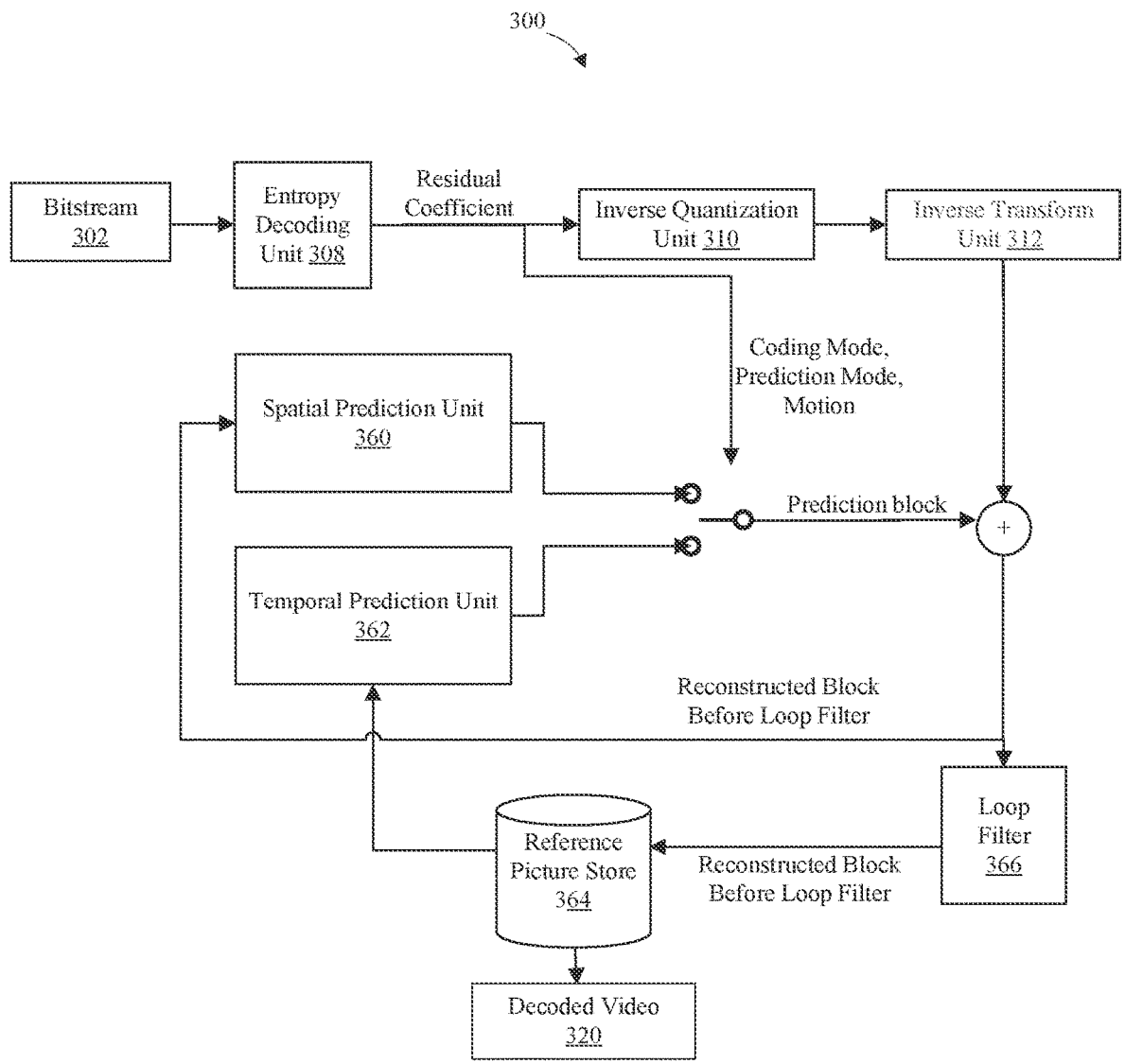
FIG. 3 is a schematic diagram illustrating an exemplary video decoder that may be a par of the exemplary system of FIG. 1, consistent with embodiments of the present disclosure.

FIG. 3 is a schematic diagram illustrating a video decoder 300, consistent with the disclosed embodiments. For example, video decoder 300 may be used as video decoder 144 in system 100 (FIG. 1). Referring to FIG. 3, a video bitstream 302 may be unpacked or entropy decoded at entropy decoding unit 308. The coding mode or prediction information may be sent to the spatial prediction unit 360 (e.g., if intra coded) or the temporal prediction unit 362 (e.g., if inter coded) to form the prediction block. If inter coded, the prediction information may comprise prediction block sizes, one or more motion vectors (e.g., which may indicate direction and amount of motion), or one or more reference indices (e.g., which may indicate from which reference picture the prediction signal is to be obtained).

Motion compensated prediction may be applied by the temporal prediction unit 362 to form the temporal prediction block. The residual transform coefficients may be sent to inverse quantization unit 310 and inverse transform unit 312 to reconstruct the residual block. The prediction block and the residual block may be added together at 326. The reconstructed block may go through in-loop filtering (via loop filer 366) before it is stored in reference picture store 364. The reconstructed video in the reference picture store 364 may be used to drive a display device or used to predict future video blocks. Decoded video 320 may be displayed on a display.

Consistent with the disclosed embodiments, the above-described video encoder and video decoder may use various video coding/decoding tools to process, compress, and decompress video data. Three tools-weighted prediction (WP), bi-prediction with weighted averaging (BWA), and history-based motion vector prediction (HMVP)—are described below.

Weighted prediction (WP) is used to provide significantly better temporal prediction when there is fading in the video sequence. Fading refers to the phenomenon when the average illumination levels of the pictures in the video content exhibit noticeable change in the temporal domain, such as fade to white or fade to black. Fading is often used by content creators to create the desired special effect and to express their artistic views. Fading causes the average illumination level of the reference picture and that of the current picture to be significantly different, making it more difficult to obtain an accurate prediction signal from as temporal neighboring pictures. As part of an effort to solve this problem. WP may provide a powerful tool to adjust the illumination level of the prediction signal obtained from the reference picture and match it to that of the current picture, thus significantly improving the temporal prediction accuracy.

Consistent with the disclosed embodiments, parameters used for WP (or "WP parameters") are signaled for each of the reference pictures used to code the current picture. For each reference picture, the WP parameters include a pair of weight and offset, (w, o), which may be signaled for each color component of the reference picture. FIG. 4 depicts a table 400 of syntax elements used for WP, according to the disclosed embodiments. Referring to Table 400, the pred_weight_table( ) syntax is signaled as part of the slice header. For the i-th reference picture in the reference picture list Lx (x can be 0 or 1), the flags luma_weight_lx_flag[i] and chroman_weight_lx_flag[i] are signaled to indicate whether weighted prediction is applied to the luma and chroma component of the i-th reference picture, respectively.

Without loss of generality, the following description uses luma as an example to illustrate signaling of WP parameters. Specifically, if the flag luma_weight_flag[i] is 1 for the i-th reference picture in the reference picture list Lx, the WP parameters (w[i], o[i]) are signaled for the luma component. Then, when applying temporal prediction using a given reference picture, the following Equation (1) applies:

$$WP(x,y)=w \cdot P(x,y)+o \qquad \text{Equation (1)},$$

where: $WP(x, y)$ is the weighted prediction signal at sample location $(x, y)$; $(w, o)$ is the WP parameter pair associated with the reference picture; and $P(x, y)=\text{ref}(x-mvx, y-mvy)$ is the prediction before WP is applied, (mvx, mvy) being the motion vector associated with the reference picture, and $\text{ref}(x, y)$ being the reference signal at location $(x, y)$. If the motion vector (mvx, mvy) has fractional sample precision, then interpolation may be applied, such as using the 8-tap luma interpolation filter in HEVC.

Figure 5:
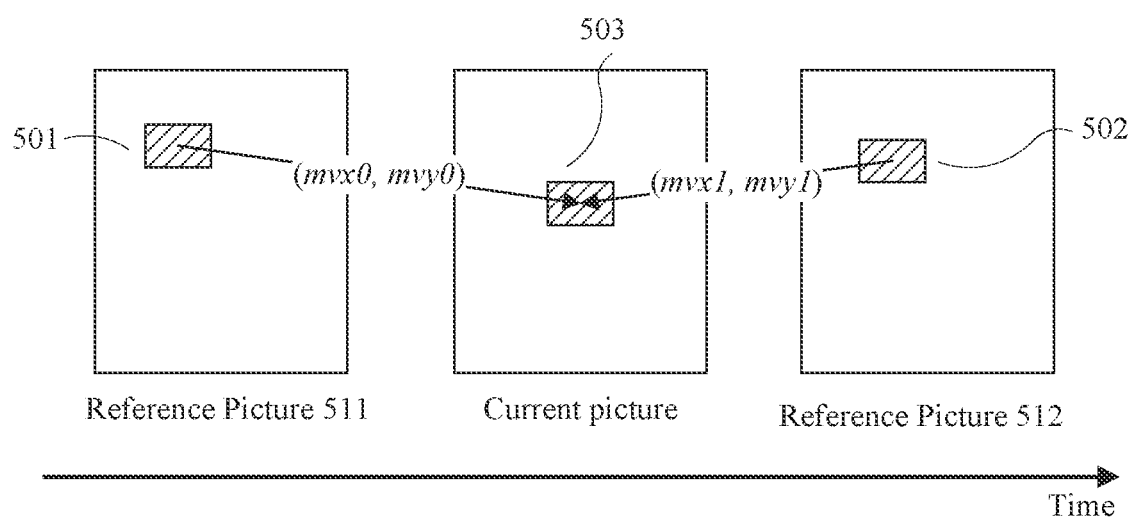
FIG. 5 is a schematic diagram illustrating bi-prediction, consistent with embodiments of the present disclosure.

For the bi-prediction with weighted averaging (BWA) tool, bi-prediction may be used to improve temporal prediction accuracy, so as to improve the compression performance of a video encoder. It is used in various video coding standards, such as H.264/AVC, HEVC, and VVC. FIG. 5 is a schematic diagram illustrating an exemplary bi-prediction. Referring to FIG. 5, CU 503 is part of the current picture. CU 501 is from reference picture 511, and CU 502 is from reference picture 512. In some embodiments, reference pictures 511 and 512 may be selected from two different reference picture lists L0 and L1, respectively. Two motion vectors, $(mvx_0, mvy_0)$ and $(mvx_1, mvy_1)$, may be generated with reference to CU 501 and CU 502, respectively. These two motion vectors form two prediction signals that may be averaged to obtain the bi-predicted signal, i.e., a prediction corresponding to CU 503.

In the disclosed embodiments, reference pictures 511 and 512 may come from the same or different picture sources. In particular, although FIG. 5 depicts that reference pictures 511 and 512 are two difference physical reference pictures corresponding to different points in time, in some embodiments reference pictures 511 and 512 may be the same physical reference picture because the same physical reference picture is allowed to appear one or more times in either or both of the reference picture lists L0 and L1. Further, although FIG. 5 depicts that reference pictures 511 and 512 are from the past and the future in the temporal domain, respectively, in some embodiments, reference pictures 511 and 512 are allowed to be both from the past or both from the future, in relationship to the current picture.

Specifically, referring to FIG. 5, bi-prediction may be performed based on the following equation:

$$P(x, y) = \frac{P_0(x, y) + P_1(x, y)}{2} = \frac{ref_0(x - mvx_0, y - mvy_0) + ref_1(x - mvx_1, y - mvy_1)}{2}, \qquad \text{Equation (2)}$$

where: $(mvx_0, mvy_0)$ is a motion vector associated with a reference picture (e.g., reference picture 511) selected from reference picture lists L0; $(mvx_1, mvy_1)$ is a motion vector associated with a reference picture (e.g., reference picture 512) selected from reference picture lists L1; and $ref_0(x, y)$ is a reference signal at location (x, y) in reference picture 511; and $ref_1(x, y)$ is a reference signal at location (x, y) in reference picture 512.

Still referring to FIG. 5, weighted prediction may be applied to bi-prediction. In some embodiments, an equal weight of 0.5 is given to each prediction signal, such that the prediction signals are averaged based on the following equation:

$$P(x, y) = \frac{w_0 \cdot P_0(x, y) + o_0 + w_1 \cdot P_1(x, y) + o_1}{2}, \quad \text{Equation (3)}$$

where ($w_0$, $o_0$) and ($w_1$, $o_1$) are the WP parameters associated with reference pictures 511 and 512, respectively.

In some embodiments. BWA is used to apply unequal weights with weighted averaging to bi-prediction, which may improve coding efficiency. BWA may be applied adaptively at the block level. For each CU, a weight index gbi_idx is signaled if certain conditions are met. FIG. 6 depicts a table 600 of syntax elements used for BWA, according to the disclosed embodiments. Referring to Table 600, a CU containing, for example, at least 256 luma samples may be bi-predicted using the syntax at 601 and 602. Based on the value of the gbi_idx, a weight w is determined, and is applied to the reference signals, according to the following:

$$P(x, y) = (1 - w) \cdot P_0(x, y) + w \cdot P_1(x, y) \quad \text{Equation (4)}$$
$$= (1 - w) \cdot ref_0(x - mvx_0, y - mvy_0) +$$
$$w \cdot ref_1(x - mvx_1, y - mvy_1).$$

In some embodiments, the value of the BWA weight w may be selected from five possible values, e.g., $w \in \{-\frac{1}{4}, \frac{3}{8}, \frac{1}{2}, \frac{5}{8}, \frac{5}{4}\}$. A low-delay (LD) picture is defined as a picture whose reference pictures all precede itself in display order. For LD pictures, all of the above five values may be used for the BWA weight. That is, in the signaling of the BWA weights, the value of weight index gbi_idx is in the range of [0, 4] with the center value (gbi_idx=2) corresponding to the value of equal weight $w=\frac{1}{2}$. For non-low-delay (non-LD) pictures, only 3 BWA weights, $w \in \{\frac{3}{8}, \frac{1}{2}, \frac{5}{8}\}$ are used. In this case, the value of weight index gbi_idx is in the range of [0.2] with the center value (gbi_idx=1) corresponding to the value of equal weight $w=\frac{1}{2}$.

If explicit signaling of weight index gbi_idx is used, the value of the BWA weight for the current CU is selected by the encoder, for example, by rate-distortion optimization. One method is to try all allowed weight values w and select the one that has the lowest rate distortion cost. However, exhaustive search of optimal combination of weights and motion vectors may significantly increase encoding time. Therefore, fast encoding methods may be applied to reduce encoding time without degrading coding efficiency.

For each bi-predicted CU, the BWA weight w may be determined and signaled in one of two ways: 1) for a non-merge CU, the weight index is signaled after the motion vector difference, as shown in Table 600 (FIG. 6); and 2) for a merge CU, the weight index gbi_idx is inferred from neighboring blocks based on the merge candidate index. The merge mode is explained in detail below.

Figure 7:
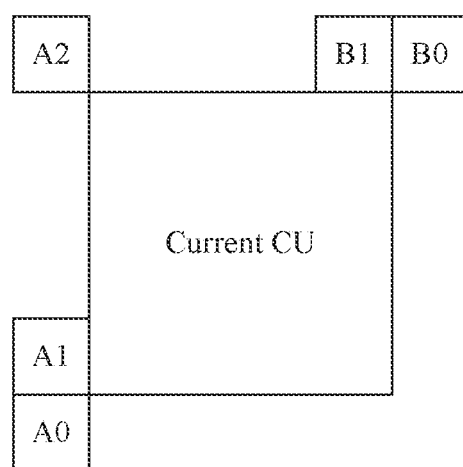
FIG. 7 is a schematic diagram illustrating spatial neighbors used in merge candidate list construction, consistent with embodiments of the present disclosure.

The merge candidates of a CU may come from neighboring blocks of the current CU, or the collocated block in the temporal collocated picture of the current CU. FIG. 7 is a schematic diagram illustrating spatial neighbors used in merge candidate list construction, according to an exemplary embodiment. FIG. 7 depicts the positions of an example of five spatial candidates of motion information. To construct the list of merge candidates, the five spatial candidates may be checked and may be added into the list, for example according to the order A1, B1, B0, A0 and A2. If the block located at a spatial position is intra-coded or outside the boundary of the current slice, it may be considered as unavailable. Redundant entries, for example where candidates have the same motion information, may be excluded from the merge candidate list.

The merge mode has been supported since the HEVC standard. The merge mode is an effective way of reducing motion signaling overhead. Instead of signaling the motion information (prediction mode, motion vectors, reference indices, etc.) of the current CU explicitly, motion information from the neighboring blocks of the current CU is used to construct a merge candidate list. Both spatial and temporal neighboring blocks can be used to construct the merge candidate list. After the merge candidate list is constructed, an index is signaled to indicate which one of the merge candidates is used to code the current CU. The motion information from that merge candidate is then used to predict the current CU.

When BWA is enabled, if the current CU is in a merge mode, then the motion information that it inherits from its merge candidate may include not only the motion vectors and reference indices, but also the weight index gbi_idx of that merge candidate. In other words, when performing motion compensated prediction, weighted averaging of the two prediction signals are performed for the current CU according to its neighbor block's weight index gbi_idx. In some embodiments, the weight index gbi_idx is only inherited from the merge candidate if the merge candidate is a spatial neighbor, and is not inherited if the candidate is a temporal neighbor.

The merge mode in HEVC constructs merge candidate list using spatial neighboring blocks and temporal neighboring block. In the example shown in FIG. 7, all spatial neighboring blocks are adjacent (i.e. connected) to the current CU. However, in some embodiments, non-adjacent neighbors may be used in the merge mode to further increase the coding efficiency of the merge mode. A merge mode using non-adjacent neighbors is called extended merge mode. In some embodiments, the History-based Motion Vector Prediction (HMVP) method in VVC may be used for inter-coding in an extended merge mode, to improve compression performance with minimum implementation cost. In HMVP, a table of HMVP candidates is maintained and updated continuously during the video encoding/decoding process. The HMVP table may include up to six entries. The HMVP candidates are inserted in the middle of the merge candidate list of the spatial neighbors and may be selected using the merge candidate index as other merge candidates to code the current CU.

A first-in-first-out (FIFO) rule is applied to remove and add entries to the table After decoding a non-affine inter-coded block, the table is updated by adding the associated motion information as a new HMVP candidate to the last entry of the table and removing the oldest HMVP candidate in the table. The table is emptied when a new slice is encountered. In some embodiments, the table may be emptied more frequently, for example, when a new coding tree unit (CTU) is encountered, or when a new row of CTU is encountered.

The above description about WP, BWA, and HMVP demonstrate a need to harmonize these tools in video coding and signaling. For example, the BWA tool and the WP tool both introduce weighting factors to the inter prediction process to improve the motion compensated prediction accuracy. However, the BWA tool's functionality is different from the WP tool. According to Equation (4). BWA applies weights in a normalized manner. That is, the weights applied to L0 prediction and L1 prediction are (1−w) and w, respectively. Because the weights add up to 1. BWA defines how the two prediction signals are combined but does not change the total energy of the bi-prediction signal. On the other hand, according to Equation (3). WP does not have the normalization constraint. That is, $w_0$ and $w_1$ do not need to add up to 1. Further, WP can add the constant offsets $o_0$ and $o_1$ according to Equation (3). Moreover. BWA and WP are suitable for different kinds of video content. Whereas WP is effective in fading video sequences (or other video content with global illumination change in the temporal domain), it does not improve coding efficiency for normal sequences when the illumination level does not change in the temporal domain. In contrast, BWA is a block-level adaptive tool that adaptively selects how to combine the two prediction signals. Though BWA is effective on normal sequences without illumination change, it is far less effective on fading sequences than the WP method. For these reasons, in some embodiments, the BWA tool and the WP tool may be both supported in a video coding standard but work in a mutually exclusive manner. Therefore, a mechanism is needed to disable one tool in the presence of the other.

Moreover, as discussed above, the BWA tool may be combined with the merge mode by allowing the weight index gbi_idx from the selected merge candidate to be inherited, if the selected merge candidate is a spatial neighbor adjacent to the current CU. To harness the benefit of HMVP, methods are needed to combine BWA with HMVP to use non-adjacent neighbors in an extended merge mode.

At least some of the disclosed embodiments provide a solution to maintain the exclusivity of WP and BWA. Whether WP is enabled for a picture or not is indicated using a combination of syntax in the Picture Parameter Set (PPS) and the slice header. FIG. 8 is a table 800 of syntax elements used for signaling enablement or disablement of WP at picture level, consistent with embodiments of the present disclosure. As shown at 801 in Table 800, weighted_pred_flag and weighted_bipred_flag are sent in the PPS to indicate whether WP is enabled for uni-prediction and bi-prediction respectively depending on the slice type of the slices that refer to this PPS. FIG. 9 is a table 900 of syntax elements used for signaling enablement or disablement of WP at slice level, consistent with embodiments of the present disclosure. As shown at 901 in Table 900, at the slice/picture level, if the PPS that the slice refers to (which is determined by matching the slice_pic_parameter_set_id of the slice header with the pps_pic_parameter_set_id of the PPS) enables WP, then pred_weight_table( ) in Table 400 (FIG. 4) is sent to a decoder to indicate the WP parameters for each of the reference pictures of the current picture.

Figure 10:
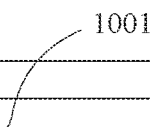
FIG. 10 is a table of syntax elements used for maintaining exclusivity of WP and BWA at CU level, consistent with embodiments of the present disclosure.

Based on such signaling, in some embodiment of this disclosure, an additional condition may be added in the CU-level weight index gbi_idx signaling. The additional condition signals that: weighted averaging is disabled for the bi-prediction mode of the current CU, if WP is enabled for the picture containing the current CU. FIG. 10 is a table 1000 of syntax elements used for maintaining exclusivity of WP and BWA at CU level, consistent with embodiments of the present disclosure. Referring to Table 100), condition 1001 may be added to indicate that: if the PPS that the current slice refers to allows WP for bi-prediction, then BWA is completely disabled for all the CUs in the current slice. This ensures that WP and BWA are exclusive.

However, the above method may completely disable BWA for all of the CUs in the current slice, regardless of whether the current CU uses reference pictures for which WP is enabled or not. This may reduce the coding efficiency. At the CU level, whether WP is enabled for its reference pictures can be determined by the values of luma_weight_l0_flag[ref_idx_l0], /chroma_weight_l0_flag [ref_idx_l0], lumna_weight_l1_flag[ref_idx_l1], and luma/chroma_weight_l1_flag[ref_idx_l1], where ref_idx_l0 and ref_idx_l1 are the reference picture indices of the current CU in L0 and L1, respectively, luma/chroma_weight_l0_flag and luma/chroma_weight_l1_flag are signaled in pred_weight_table( ) for both the L0 and L1 reference pictures for the current slice, as shown in Table 400 (FIG. 4). FIG. 11 is a table 1100 of syntax elements used for maintaining exclusivity of WP and BWA at CU level, consistent with embodiments of the present disclosure. Referring to Table 1100, condition 1101 is added to control the exclusivity of WP and BWA at CU level, regardless of whether weight index gbi_idx is signaled or not. When weight index gbi_idx is not signaled, it is inferred to be the default value (i.e., 1 or 2 depending on whether 3 or 5 BWA weights are allowed) that represents the equal-weight case.

The methods illustrated in Table 1000 and Table 1100 both add condition(s) to the signaling of weight index gbi_idx at the CU level, which could complicate the parsing process at the decoder. Therefore, in a third embodiment, the weight index gbi_idx signaling conditions are kept the same as those in Table 600 (FIG. 6). And it becomes a bitstream conformance constraint for the encoder to always send the default value of weight index gbi_idx for the current CU if WP is enabled for either the luma or chroma component of either the L0 or L1 reference picture. That is, weight index gbi_idx values that correspond to unequal weights can only be sent if WP is not enabled for both the luma and chroma components for both the L0 and L1 reference pictures. Though this signaling is redundant, because the Context Adaptive Binary Arithmetic Coding (CABAC) engine in the entropy coding stage can adapt to the statistics of the weight index gbi_idx values, the actual bit cost of this redundant signaling may be negligible. Further, this simplifies the parsing process.

After a decoder (e.g., encoder 300 in FIG. 3) receives a bitstream including the above-described syntax for maintaining the exclusivity of WP and BWA, the decoder may parse the bitstream and determine, based on the syntax, whether BWA is disabled or not.

At least some of the embodiments of the disclosure can provide a solution for symmetric signaling BWA at CU level. As discussed above, in some embodiments, the CU level weight used in BWA is signaled as a weight index, gbi_idx, with the value of gbi_idx being in the range of [0, 4] for low-delay (LD) pictures and in the range of [0, 2] for non-LD pictures. However, this creates an inconsistency between the LD pictures and non-LD pictures, as shown below:

| gbi_idx value | 0 | 1 | 2 | 3 | 4 |
|---|---|---|---|---|---|
| w in LD pictures | $-\frac{1}{4}$ | $\frac{3}{8}$ | $\frac{1}{2}$ | $\frac{5}{8}$ | $\frac{5}{4}$ |

-continued

| gbi_idx value | 0 | 1 | 2 | 3 | 4 |
|---|---|---|---|---|---|
| w in non-LD pictures | $\frac{3}{8}$ | $\frac{1}{2}$ | $\frac{5}{8}$ | n/a | n/a |

Here, the same BWA weight value is represented by different gbi_idx values in LD and non-LD pictures.

Figure 12:
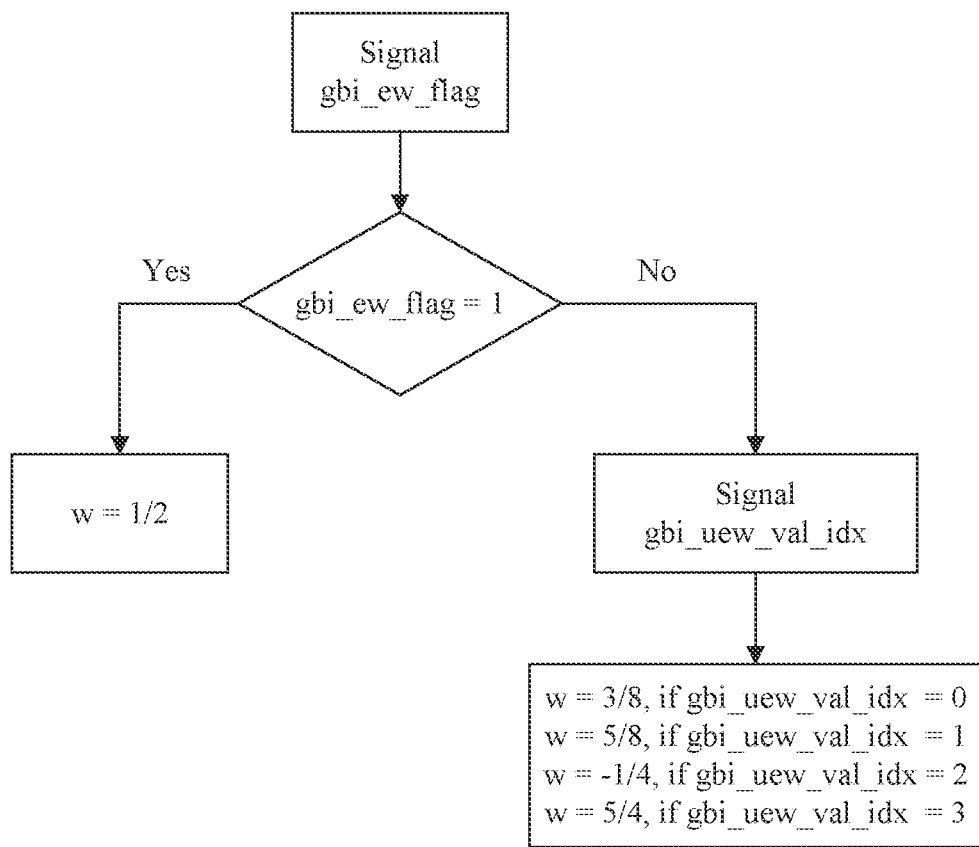
FIG. 12 is a flowchart of a BWA weight signaling process used for LD picture, consistent with embodiments of the present disclosure.
Figure 13:
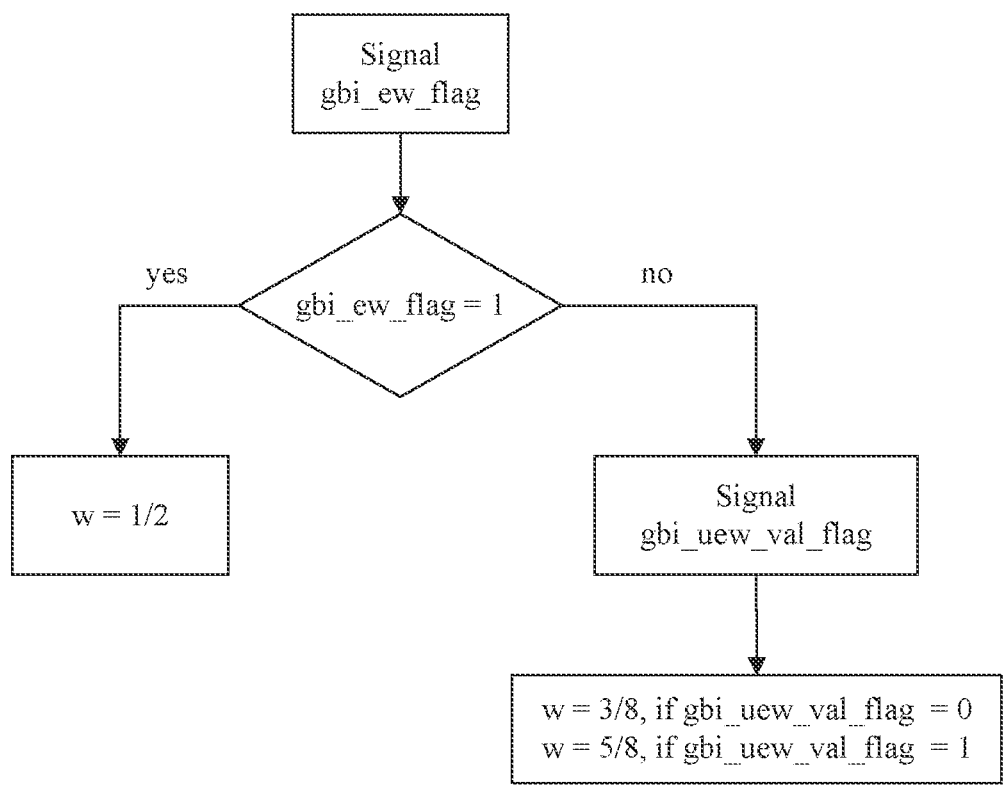
FIG. 13 is a flowchart of a BWA weight signaling process used for non-LD picture, consistent with embodiments of the present disclosure.

In order to improve signaling consistency, according to some disclosed embodiments, the signaling of weight index gbi_idx may be modified into a first flag indicating if the BWA weight is equal weight, followed by either an index or a flag for non-equal weights. FIG. 12 and FIG. 13 illustrate flowcharts of exemplary BWA weight signaling processes used for LD picture and non-LD picture, respectively. For LD pictures that allow 5 BWA weight values, the signaling flow in FIG. 12 is used, and for non-LD pictures that allow 3 BWA weight values, the signaling flow in FIG. 13 is used. The rust flag gbi_ew_flag indicates whether equal weight is applied in BWA. If gbi_ew_flag is 1, then no further signaling is needed, because equal weight is applied (w=½); otherwise, a flag (1 bit for 2 values) or an index (2 bits for 4 values) is signaled to indicate which of the unequal weights is applied. FIGS. 12 and 13 only illustrate one example of possible mapping relationship between BWA weight values and the index/flag values. It is contemplated that other mappings between the weight values and index/flag values may be used. Another benefit of splitting the weight index gbi_idx into two syntax elements, gbi_ew_flag and gbi_uew_val_idx (or gbi_uew_val_flag) is that separate CABAC contexts may be used to code these values. Further, for the LD pictures when a 2-bit value gbi_uew_val_idx is used, separate CABAC contexts may be used to code the first bit and second bit.

After a decoder (e.g., encoder 300 in FIG. 3) receives the above-described signaling of BWA at CU level, the decoder may parse the signaling and determine, based on the signaling, whether the BWA uses an equal weight. If the BWA is determined to be an unequal weight, the decoder may further determine, based on the signaling, a value of the unequal weight.

Some embodiments of the present disclosure provide a solution to combine BWA and HMVP. If the motion information stored in the HMVP table only includes motion vectors, reference indices, and prediction modes (e.g. uni-prediction vs. bi-prediction) for the merge candidates, the merge candidates cannot be used with BWA because no BWA weight is stored or updated in the HMVP table. Therefore, according to some disclosed embodiments. BWA weights are included as part of the motion information stored in the HMVP table. When the HMVP table is updated, the BWA weights are also updated together with other motion information, such as motion vectors, reference indices, and prediction modes.

Moreover, a partial pruning may be applied to avoid having too many identical candidates in the merge candidate list. Identical candidates are defined as candidates whose motion information is the same as at least one of the existing merge candidate in the merge candidate list. An identical candidate takes up a space in the merge candidate list but does not provide any additional motion information. Partial pruning detects some of these cases and may prevent some of these identical candidates to be added into the merge candidate list. By including BWA weights in the HMVP table, the pruning process also considers BWA weights in deciding whether two merge candidates are identical. Specifically, if a new candidate has identical motion vectors, reference indices, and prediction modes as another candidate in the merge candidate list, but has a different BWA weight from the other candidate, the new candidate may be considered to be not identical, and may not be pruned.

After a decoder (e.g., encoder 300 in FIG. 3) receives a bitstream including the above-described HMVP table, the decoder may parse the bitstream and determine the BWA weights of the merge candidates included in the HMVP table.

Figure 14:
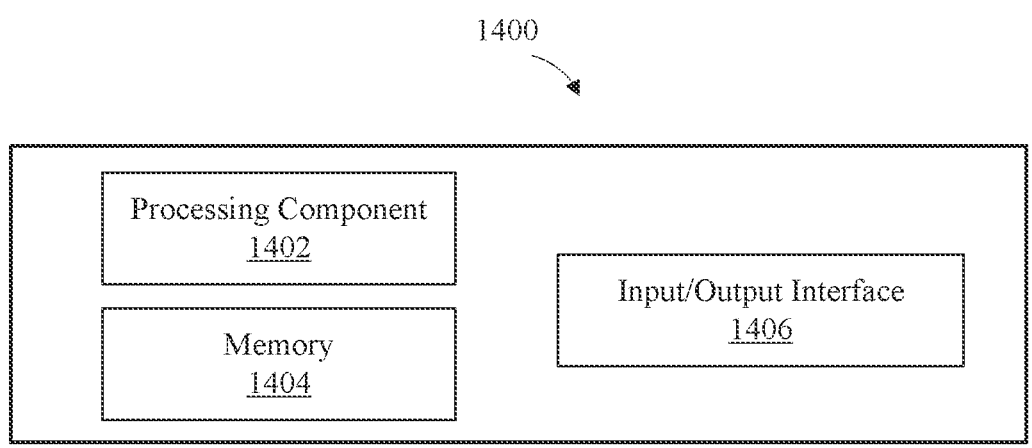
FIG. 14 is a block diagram of a video processing apparatus, consistent with embodiments of the present disclosure.

FIG. 14 is a block diagram of a video processing apparatus 1400, consistent with embodiments of the present disclosure. For example, apparatus 1400 may embody a video encoder (e.g., video encoder 200 in FIG. 2) or video decoder (e.g., video decoder 300 in FIG. 3) described above. In the disclosed embodiments, apparatus 1400 may be configured to perform the above-described methods for coding and signaling the BWA weights. Referring to FIG. 14, apparatus 1400 may include a processing component 1402, a memory 1404, and an input/output (I/O) interface 1406. Apparatus 1400 may also include one or more of a power component and a multimedia component (not shown), or any other suitable hardware or software components.

Processing component 1402 may control overall operations of apparatus 1400. For example, processing component 1402 may include one or more processors that execute instructions to perform the above-described methods for coding and signaling the BWA weights. Moreover, processing component 1402 may include one or more modules that facilitate the interaction between processing component 1402 and other components. For instance, processing component 1402 may include an I/O module to facilitate the interaction between the I/O interface and processing component 1402.

Memory 1404 is configured to store various types of data or instructions to support the operation of apparatus 1400. Memory 1404 may include a non-transitory computer-readable storage medium including instructions for applications or methods operated on apparatus 1400, executable by the one or more processors of apparatus 1400. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, cloud storage, a FLASH-EPROM or any other flash memory. NVRAM, a cache, a register, any other memory chip or cartridge, and networked versions of the same.

I/O interface 1406 provides an interface between processing component 1402 and peripheral interface modules, such as a camera or a display. I/O interface 1406 may employ communication protocols/methods such as audio, analog, digital, serial bus, universal serial bus (USB), infrared, PS/2, BNC, coaxial, RF antennas, Bluetooth, etc. I/O interface 1406 may also be configured to facilitate communication, wired or wirelessly, between apparatus 1400 and other devices, such as devices connected to the Internet. Apparatus can access a wireless network based on one or more communication standards, such as WiFi, LTE, 2G, 3G, 4G, 5G, etc.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C. or B and C, or A and B and C.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A computer-implemented video decoding method, comprising:
   receiving a bitstream comprising weight information used for prediction of a coding unit (CU); and
   based on the weight information,
      performing weighted bi-prediction of the CU and disabling bi-prediction with weighted averaging (BWA) for the CU, or
      performing the BWA of the CU and disabling the weighted bi-prediction for the CU.

2. The method of claim 1, further comprising:
   in response to the weight information indicating that weighted prediction is enabled for the CU, performing the weighted bi-prediction of the CU and disabling the BWA for the CU.

3. The method of claim 1, further comprising:
   in response to the weight information indicating that weighted prediction is enabled for a picture including the CU, performing the weighted bi-prediction of the CU and disabling the BWA for the CU.

4. The method of claim 3, wherein the weight information comprises:
   a picture parameter set indicating that the weighted prediction is enabled for the picture, and
   a slice header indicating that the CU is associated with the picture.

5. The method of claim 1, further comprising:
   in response to an index associated with the BWA being signaled in the bitstream, performing the BWA of the CU and disabling the weighted bi-prediction for the CU.

6. The method of claim 1, further comprising:
   in response to a determination that no index associated with the BWA is signaled in the bitstream, determining whether weighted prediction is enabled for a reference picture of the CU; and
   in response to a determination that the weighted prediction is enabled for at least one of a luma component or a chroma component of the reference picture of the CU, performing the weighted bi-prediction of the CU and disabling the BWA for the CU, or
   in response to a determination that the weighted prediction is not enabled for the reference picture of the CU, performing BWA with an equal weight on the CU and disabling the weighted bi-prediction for the CU.

7. The method of claim 1, further comprising:
   in response to an index associated with an unequal weight of the BWA being signaled in the bitstream, performing the BWA of the CU and disabling the weighted bi-prediction for the CU.

8. The method of claim 1, further comprising:
   in response to an index associated with an equal weight of the BWA being signaled in the bitstream, performing the weighted bi-prediction of the CU and disabling the BWA for the CU.

9. A video decoder comprising:
   a memory storing instructions; and
   a processor configured to execute the instructions to cause the video decoder to:
      receive a bitstream comprising weight information used for prediction of a coding unit (CU); and
      based on the weight information,
         perform weighted bi-prediction of the CU and disable bi-prediction with weighted averaging (BWA) for the CU, or
         perform the BWA of the CU and disable the weighted bi-prediction for the CU.

10. The video decoder of claim 9, wherein the processor is configured to execute the instructions to cause the video decoder to:
    in response to the weight information indicating that weighted prediction is enabled for the CU, perform the weighted bi-prediction of the Cl and disable the BWA for the CU.

11. The video decoder of claim 9, wherein the processor is configured to execute the instructions to cause the video decoder to:
    in response to the weight information indicating that weighted prediction is enabled for a picture including the CU, perform the weighted bi-prediction of the CU and disable the BWA for the CU.

12. The video decoder of claim 11, wherein the weight information comprises:
    a picture parameter set indicating that the weighted prediction is enabled for the picture, and
    a slice header indicating that the CU is associated with the picture.

13. The video decoder of claim 9, wherein the processor is configured to execute the instructions to cause the video decoder to:
    in response to an index associated with the BWA being signaled in the bitstream, perform the BWA of the CU and disable the weighted bi-prediction for the CU.

14. The video decoder of claim 9, wherein the processor is configured to execute the instructions to cause the video decoder to:
    in response to a determination that no index associated with the BWA is signaled in the bitstream, determine whether weighted prediction is enabled for a reference picture of the CU; and
    in response to a determination that the weighted prediction is enabled for at least one of a luma component or a chroma component of the reference picture of the CU, perform the weighted bi-prediction of the CU and disable the BWA for the CU, or
    in response to a determination that the weighted prediction is not enabled for the reference picture of the CU, perform BWA with an equal weight on the CU and disable the weighted bi-prediction for the CU.

15. The video decoder of claim 9, wherein the processor is configured to execute the instructions to cause the video decoder to:
    in response to an index associated with an unequal weight of the BWA being signaled in the bitstream, perform the BWA of the CU and disable the weighted bi-prediction for the CU.

16. The video decoder of claim 9, wherein the processor is configured to execute the instructions to cause the video decoder to:

in response to an index associated with an equal weight of the BWA being signaled in the bitstream, perform the weighted bi-prediction of the CU and disable the BWA for the CU.

17. A non-transitory computer-readable medium storing a set of instructions that is executable by one or more processors of a video decoder to cause the video decoder to perform a method comprising:
- receiving a bitstream comprising weight information used for prediction of a coding unit (CU); and
- based on the weight information,
  - performing weighted bi-prediction of the CU and disabling bi-prediction with weighted averaging (BWA) for the CU, or
  - performing the BWA of the CU and disabling the weighted bi-prediction for the CU.

18. The medium of claim 17, wherein e set of instructions is executable by the one or more processors of the video decoder to cause the video decoder to further perform:
- in response to the weight information indicating that weighted prediction is enabled for the CU, performing the weighted bi-prediction of the CU and disabling the BWA for the CU.

19. The medium of claim 17, wherein set of instructions is executable by the one or more processors of the video decoder to cause the video decoder to further perform:
- in response to the weight information indicating that weighted prediction is enabled for a picture including the CU, performing the weighted bi-prediction of the CU and disabling the BWA for the CU.

20. The medium of claim 19, wherein the weight information comprises:
- a picture parameter set indicating that the weighted prediction is enabled for the picture, and
- a slice header indicating that the CU is associated with the picture.

* * * * *